United States Patent [19]

Winsel et al.

[11] 4,003,754

[45] Jan. 18, 1977

[54] HERMETIC ALKALINE STORAGE BATTERY

[75] Inventors: August Winsel, Kelkheim; Eckart Buder, Kriftel, both of Germany

[73] Assignee: Varta Batterie Aktiengesellschaft, Hannover, Germany

[22] Filed: Aug. 14, 1975

[21] Appl. No.: 604,496

[30] Foreign Application Priority Data

Nov. 7, 1974 Germany ............... 2452064

[52] U.S. Cl. ............... 429/149; 429/52; 429/221; 429/222; 429/223
[51] Int. Cl.² ............... H01M 4/38
[58] Field of Search ............... 136/24, 28, 25, 6 R, 136/120 FC, 120 R

[56] References Cited

UNITED STATES PATENTS

| | | | |
|---|---|---|---|
| 2,934,580 | 4/1960 | Neumann | 136/28 X |
| 2,951,106 | 8/1960 | Ruetschi | 136/24 X |
| 3,174,878 | 3/1965 | Peters | 136/24 X |
| 3,174,879 | 3/1965 | Stanimirovitch | 136/24 X |

*Primary Examiner*—John H. Mack
*Assistant Examiner*—C. F. Lefevour
*Attorney, Agent, or Firm*—Weiser, Stapler & Spivak

[57] ABSTRACT

Alkaline storage battery cells having negative electrodes with higher capacity than the positive electrodes. The positive electrodes have discharge limiting capacity. The negative electrodes have additive of Raney metal, or Raney metal alloy. Such cells constituting a battery.

23 Claims, No Drawings

HERMETIC ALKALINE STORAGE BATTERY

This invention relates to hermetically sealed alkaline storage batteries, and particularly to nickel cadmium storage batteries with negative electrodes having a higher charging capacity than the positive electrodes.

Hermetically sealed alkaline storage batteries are well known. In such batteries, precautions are taken to prevent dangerously high internal pressures from developing. Through evolution of gases, particularly during overcharging and during polarity reversal attributable to the electrolysis of the electrolyte, it is possible for the pressure inside a hermetically sealed storage battery to rise with continuing current flow unitl the casing bursts. Mechanical and electrical safety devices, such as the placement of a relief valve in the storage batter casing, or regulation of the charging and discharging currents by special auxiliary electrodes, are expensive and, particularly for small cells, not always practical.

It has also been attempted to recombine the evolved hydrogen and oxygen gases by means of catalysts or to have them removed by absorbing means. Catalytic transformation tends to be unreliable because hydrogen and oxygen are normally not liberated in 2:1 stochiometric relationship. The adsorption method offers protection only for short periods of time depending upon the quantity of the adsorbent used. Conventional hermetic alkaline storage batteries, and particularly nickel cadmium batteries, are therefore constructed based on the oxygen cycle principle. This means that the battery is constructed so that the negative electrode has more reducing equivalent active mass than the positive electrode has oxidizing equivalent. In other words, the negative electrode has a charge reserve. The excess uncharged negative mass prevents evolution of hydrogen during overcharging of the hermetically sealed cell. The oxygen evolved at the positive electrode of the active mass is consumed by the active mass of the negative electrode.

In known storage batteries, special precautions have also been taken to prevent hydrogen evolution during so-called polarity reversal, i.e., during prolonged deep discharge. This is especially important when several cells are connected in a cell cluster, so that during discharge one or more cells are prematurely exhausted, while current flow continues in the discharge direction through the remaining cells. In order to prevent, under these conditions, gas evolution capable of bursting the battery, the capacity limiting electrode is equipped with antipolar mass in addition to its conventional active mass. This is a mass such as is conventionally contained in the electrode of the opposite polarity. Thus, the negative electrode also contains nickel hydroxide and the positive electrode cadmium hydroxide. If, for that purpose, the positive electrode contains cadmium hydroxide, which is reduced to cadmium upon persistent current throughflow, hydrogen evolution is prevented. The antipolar mass which is added to the positive electrode must be capable of handling all of the structurally determined capacity fluctuations resulting from polarity reversal. Consequently, in the final analysis, the presence of the antipolar mass leads to a reduction in the capacity which can be provided within a given volume.

It has also been proposed to operate hermetically sealed nickel cadmium batteries in a hydrogen cycle (see British Pat. No. 1,201,244, based on German patent publication Auslegeschrift No. 1,596,246). To that end, the positive electrode has a charge reserve and the negative electrode a discharge reserve. As a result, overcharging produces evolution of hydrogen at the negative electrode, which is consumed at the positive electrode. Polarity reversal causes evolution of hydrogen at the initially positive electrode, which reacts with the active or, as the case may be, antipolar mass of the negative electrode to form water. However, cells of this construction have not assumed any practical importance. This is mainly attributable to the fact that their gas consumption mechanism is inadequate for the production of a truly hermetically sealed storage battery capable of being operated with sufficient reliability.

As a result, in all practical embodiments of hermetically sealed storage batteries, the effort has heretofore been directed to the suppression of hydrogen evolution under all operating conditions.

In alkaline nickel cadmium storage batteries, the positive electrode consists of nickel oxide, or nickel hydroxide, and the negative cadmium electrode also contains nickel as conductive material, e.g., in the form of carbonyl nickel or as nickel flakes, as in the form of the sinter frame carrying the active mass. This nickel is partially in the form of nickel oxide, because the surface layers are passively oxidized so that, during the actual charging and discharging of the battery, only the cadmium is oxidized or reduced. Thus, the discharge is determined by the potential step of the cadmium hydroxide electrode. Particularly overcharging, with the accompanying high temperatures, nickel oxide present in the negative electrode can be reduced to nickel, at a sacrifice of capacity of the cadmium mass. In the ensuing discharge, two potential steps are discernible. The first corresponds to oxidation of the cadmium. The second, which is 100 millivolts lower, corresponds to oxidation of the nickel. These phenomena are very undesirable, because such potential variations produce disturbances in many electronic instruments. Upon complete discharge and subsequent recharging, only the cadmium is again reduced, while the nickel surface remains oxidized. The next cycle therefore again causes the full capacity to manifest itself in the cadmium step.

Accordingly, it is a primary object of the invention to prevent the occurrence of the second discharge step.

It is another object to dispense with the addition of antipolar mass, which does not contribute to the effective capacity of the cell.

These and other objects which will appear are achieved in accordance with the present invention by providing a positive electrode which is discharge limiting, and a negative electrode to which is added a Raney metal alloy of one or more metals in Group VIII of the periodic table, in a quantity sufficient to conduct the maximum permissible polarity reversal current of the cell.

In such a cell construction, in which the positive electrode is charge limiting as well as discharge limiting, i.e., the negative electrode has a charge reserve as well as a discharge reserve, oxygen evolves during protracted charging. The known oxygen cycle takes place during protracted discharge, i.e., during polarity reversal hydrogen evolves. This has the significant advantage that little heat is evolved during polarity reversal, because the polarization of $H_2$ electrodes is considerable smaller than of $O_2$ electrodes, in both directions of the reaction. As hydrogen catalyst the negative electrode contains a Raney metal catalyst, preferably Raney nickel. It is desirable that hydrogen evolution at the positive electrode begins at a time at which the hydrogen catalyst of the negative electrode is not yet covered with a hydroxide layer. When the Raney nickel catalyst is present with reduced surface, the hydrogen produced through polarity reversal is reduced at the catalyst in the negative electrode. This catalyst must be proportioned for the maximum polarity reversal current intensity, but not for the expected duration of the polarity reversal. The total quantity of catalyst can therefore be much less than the conventional quantity of antipolar mass, which ordinarily amounts to 20 to 30% of the total capacity. The lower limit of the Raney nickel additive is determined by the performance requirement of the $H_2$ cycle during polarity reversal and is preferably in excess of 0.25 grams/ampere, for example approximately 1 gram/ampere. Use of a Raney metal catalyst, or rather a Raney nickel catalyst, therefore does not lead to substantial increase in the weight of the electrode. The Raney nickel in its reduced form is a good conductor which can be mixed in with the powder forming the negative electrode. It then performs simultaneously the function of conductive material and hydrogen consuming catalyst. For mass electrodes there can be admixed to the negative electrode, in addition to this catalyst a binder of hydrophobic substances, such as polyethylene or polytetrafluorethylene powder. These additives produce hydrophobic regions and facilate gas penetration.

For sinter electrodes, the active mass is customarily embodied in a sinter frame. In this case, the Raney metal catalyst can be produced, for example, by forming a double skeleton catalyst structure as disclosed in U.S. Pat. No. 3,150,011. In that case, powdery support frme material and powdery Raney alloy are applied, pressed or rolled onto the surface of a metallic form. The body is sintered at elevated temperatures and then treated in lye or acid to dissolve out the soluble components of the Raney alloy. It is also possible to produce the Raney structure by application of an aluminum or zinc layer to the nickel carrier. This material is then alloyed and subsequently dissolved out by treatment with potassium hydrate. Suitable activating additives, particularly for Raney nickel, are platinum, palladium, copper, aluminum, zinc oxide, and lithium oxide. To enhance the catalytic activity of the Raney catalyst, known techniques may be used, such as the process disclosed in U.S. Pat. No. 3,235,213. There, organic compounds are added during treatment in concentrated potassium hydrate to form soluble complex substances with the catalytically inactive element of the alloy. For example, tartrates are suitable for complex substance formation. To provide the oxygen cycle described during overcharging and the hydrogen cycle during deep discharge and polarity reversal, it is important in what manner the active masses are assembled or treated within the cell. For example, the negative electrode may be introduced into the cell casing in reduced form, together with the fully oxidized, i.e., fully charged positive electrode. The casing is then hermetically sealed. The negative electrode should contain cadmium hydroxide, in order to provide a reliable start for the oxygen cycle during overcharging. This condition of the negative electrode can be achieved by electrochemical hydrogen separation in an alkaline medium at temperatures in excess of about 40° C. The process proceeds more rapidly as the temperature goes up. Preferred are temperatures of about 60 to about 80° C. Not only the cadmium but also the Raney nickel surface and the surface of the remaining nickel components of the electrode thereby become reduced, so that it becomes electrochemically active relative to the hydrogen. Renewed oxidation of the Raney nickel can then not take place, because the Raney nickel present in the moist electrode is protected from oxidation by the metallic cadmium.

Another possible assembly procedure involves introducing the positive electrode into the cell while completely discharged. The negative electrode then contains oxidized Raney nickel and oxidized cadmium in a quantity which is capable of forming a charge reserve greater than that corresponding to the capacity of the positive electrode. Additionally, it contains at least as much unoxidized metallic cadmium as corresponds to the reduction capacity of the Raney nickel. After introduction into the cell, charging is carried out at elevated temperature such as about 60° C. over an extended period. In so doing, the nobler Raney nickel is reduced. At the end there exists a fully charged electrode as well as a negative electrode with a completely reduced Raney metal catalyst, preferably a Raney nickel catalyst. By virtue of the charge reserve of the negative electrode oxygen evolves during overcharging at the positive electrode. This oxygen diffuses to the negative electrode and is there reduced, so that there can be no hydrogen evolution at the negative electrode. During deep discharging with polarity reversal, the capacity of the positive electrode becomes exhausted first. Consequently, hydrogen evolution takes place there. This hydrogen reaches the negative electrode and is anodically oxidized by the Raney metal. Because of the long life of the Raney nickel, it is possible to count on virtually unlimited operation of this hydrogen consumption mechanism. For example, at room temperature Raney nickel quantities of about 50 mg/cm$^2$ can produce anodic current densities of about 200 ma/cm$^2$ at the hydrogen electrodes of fuel cell elements. The charge reserve should amount to 5 to 50%, preferably about 10 to 30% of the capacity of the positive electrode. The discharge reserve should likewise amount to 5 to 50%, preferably about 20%.

As Raney metal catalysts there are particularly useful Raney nickel, Raney nickel iron, Raney nickel cobalt and Raney nickel with palladium or platinum alloy additives.

The invention is particularly suitable for hermetic nickel cadmium storage batteries, but can also be utilized for other alkaline storage batteries, such as nickel iron batteries.

We claim:
1. In an alkaline storage battery cell which is hermetically sealed, and which includes a negative electrode having higher capacity than the positive electrode, the improvement wherein
   the positive electrode is constructed and arranged to provide a capacity which is limiting during discharging, and
   the negative electrode includes additive selected from the group of reduced Raney metal and Raney metal alloy of one or more metals in Group VIII of the periodic table,
   the additive being present in a quantity sufficient to conduct the maximum polarity reversal current.
2. The cell of claim 1 wherein the selected additive includes Raney nickel.

3. The cell of claim 1 wherein the additive is selected from the group of Raney nickel, Raney nickel iron, Raney nickel cobalt, Raney nickel with palladium alloy, and Raney nickel with platinum alloy.

4. The cell of claim 1 wherein the electrodes are substantially free of anitpolar mass.

5. The cell of claim 1 wherein the additive is present in an amount greater than about 0.25 grams/ampere of polarity reversal current.

6. The cell of claim 1 wherein the negative electrode also includes a hydrophobic medium.

7. The cell of claim 1 which has nickel and cadmium electrodes.

8. The cell of claim 1 which has nickel and iron electrodes.

9. A battery formed of a plurality of cells according to claim 1.

10. The cell of claim 4 which is assembled by a process comprising the steps of introducing the positive electrode in substantially discharged condition, and introducing the negative electrode with oxidized Raney nickel and oxidized cadmium.

11. The cell of claim 2 which is assembled by a process comprising the steps of introducing the positive electrode in substantially charged condition and the negative electrode in substantially reduced condition.

12. The cell of claim 5 wherein the additive is present in an amount of about 1 gram/ampere.

13. The cell of claim 10 wherein the negative electrode introduced in the assembly process further contains unoxidized cadmium.

14. The cell of claim 13 whose assembly process comprises the further step of charging at elevated temepratures.

15. The cell of claim 11 whose assembly process comprises the further step of removing hydrogen from the negative electrode by exposing said electrode to an alkaline medium at temperatures above about 40° C.

16. In the method of producing an alkaline storage battery cell which is hermetically sealed, which includes a negative electrode having higher capacity than the positive electrode and which is subject to polarity reversal during deep discharging
the improvement which comprises the step of incorporating in the negative electrode additive selected from the group of reduced Raney metal and Raney metal alloy of one or more metals in Group VIII of the periodic table in a quantity sufficient to conduct the maximum polarity reversal current.

17. The method of claim 16 wherein the additive is incorporated in a quantity sufficient to conduct the maximum polarity reversal current.

18. The method of claim 16 wherein the electrodes are formed substantially free of antipolar mass.

19. The method of claim 16 further comprising the steps of introducing the positive electrode into the cell in substantially discharged condition, and introducing the negative electrode with oxidized Raney nickel and oxidized cadmium.

20. The method of claim 16 further comprising charging the cell at elevated temperatures.

21. The method of claim 16 wherein the positive electrode is introduced into the cell in substantially charged condition and the negative electrode in substantially reduced condition.

22. The method of claim 16 further comprising the step of removing hydrogen from the negative electrode by exposing said electrode to an alkaline medium at temperatures above about 40° C.

23. The method of claim 19 further comprising incorporating unoxidized cadmium into the negative electrode.

* * * * *